United States Patent
Manly et al.

(10) Patent No.: US 11,693,252 B2
(45) Date of Patent: Jul. 4, 2023

(54) ATTENUATION OF LIGHT TRANSMISSION ARTIFACTS IN WEARABLE DISPLAYS

(71) Applicant: Magic Leap, Inc., Plantation, FL (US)

(72) Inventors: David Manly, Miami, FL (US); Kevin Messer, Fort Lauderdale, FL (US); Vaibhav Mathur, Weston, FL (US); Clinton Carlisle, Parkland, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/072,510

(22) Filed: Oct. 16, 2020

(65) Prior Publication Data

US 2021/0116712 A1   Apr. 22, 2021

Related U.S. Application Data

(60) Provisional application No. 62/916,350, filed on Oct. 17, 2019.

(51) Int. Cl.
*G02B 27/28* (2006.01)
*G02B 27/01* (2006.01)
(Continued)

(52) U.S. Cl.
CPC ......... *G02B 27/281* (2013.01); *G02B 5/3025* (2013.01); *G02B 27/0172* (2013.01);
(Continued)

(58) Field of Classification Search
CPC .. G02B 27/288; G02B 2027/012; G02B 5/30; G02B 2027/0178; G02B 2027/014;
(Continued)

(56) References Cited

U.S. PATENT DOCUMENTS

| 7,758,185 B2 | 7/2010 | Lewis |
| 8,353,594 B2 | 1/2013 | Lewis |

(Continued)

FOREIGN PATENT DOCUMENTS

| WO | 2005124431 A1 | 12/2005 |
| WO | 2020/069026 A1 | 4/2020 |

OTHER PUBLICATIONS

Azuma, "A Survey of Augmented Reality," Presence: Teleoperators and Virtual Environments, Aug. 1997, 6(4):355-385.
(Continued)

*Primary Examiner* — Mariam Qureshi
(74) *Attorney, Agent, or Firm* — Fish & Richardson P.C.

(57) ABSTRACT

A wearable display system includes an eyepiece stack having a world side and a user side opposite the world side, wherein during use a user positioned on the user side views displayed images delivered by the system via the eyepiece stack which augment the user's view of the user's environment. The wearable display system also includes an angularly selective film arranged on the world side of the of the eyepiece stack. The angularly selective film includes a polarization adjusting film arranged between pair of linear polarizers. The linear polarizers and polarization adjusting film significantly reduces transmission of visible light incident on the angularly selective film at large angles of incidence without significantly reducing transmission of light incident on the angularly selective film at small angles of incidence.

19 Claims, 15 Drawing Sheets

(51) Int. Cl.
    *G02F 1/137* (2006.01)
    *G02F 1/1335* (2006.01)
    *G02B 5/30* (2006.01)
(52) U.S. Cl.
    CPC ........ *G02F 1/137* (2013.01); *G02F 1/133528* (2013.01); *G02B 2027/014* (2013.01); *G02B 2027/0178* (2013.01)
(58) Field of Classification Search
    CPC .............. G02B 27/0172; G02B 27/281; G02B 27/0101; G02B 27/017; G02B 2027/0118; G02B 2027/0121; G02B 2027/015; G02F 1/137; G02F 1/133528; B60R 2300/205; G03B 21/604
    See application file for complete search history.

(56) References Cited

U.S. PATENT DOCUMENTS

| | | | |
|---|---|---|---|
| 8,696,113 | B2 | 4/2014 | Lewis |
| 8,733,927 | B1 | 5/2014 | Lewis |
| 8,733,928 | B1 | 5/2014 | Lewis |
| 9,010,929 | B2 | 4/2015 | Lewis |
| 9,235,064 | B2 | 1/2016 | Lewis |
| 9,239,473 | B2 | 1/2016 | Lewis |
| 9,244,293 | B2 | 1/2016 | Lewis |
| 9,658,473 | B2 | 5/2017 | Lewis |
| 10,151,937 | B2 | 12/2018 | Lewis |
| 10,185,147 | B2 | 1/2019 | Lewis |
| 11,067,809 | B1* | 7/2021 | Sears ................. G02B 27/0081 |
| 2006/0285207 | A1 | 12/2006 | Hay |
| 2008/0151160 | A1 | 6/2008 | Wang et al. |
| 2009/0051707 | A1 | 2/2009 | Hirata et al. |
| 2011/0069267 | A1 | 3/2011 | Moon et al. |
| 2012/0169950 | A1 | 7/2012 | Tatzel et al. |
| 2013/0127980 | A1 | 5/2013 | Haddick et al. |
| 2013/0176704 | A1 | 7/2013 | Lanman et al. |
| 2014/0233105 | A1 | 8/2014 | Schmeder et al. |
| 2015/0205126 | A1 | 7/2015 | Schowengerdt |
| 2016/0291230 | A1 | 10/2016 | Weichelt et al. |
| 2018/0059414 | A1 | 3/2018 | Campbell et al. |
| 2018/0113334 | A1* | 4/2018 | Fang ................... G02F 1/1323 |
| 2018/0136471 | A1 | 5/2018 | Miller et al. |
| 2018/0180890 | A1 | 6/2018 | Baerenrodt et al. |
| 2018/0188536 | A1 | 7/2018 | Bell et al. |
| 2018/0239146 | A1 | 8/2018 | Bierhuizen et al. |
| 2018/0275415 | A1 | 9/2018 | Schowengerdt et al. |
| 2019/0086672 | A1* | 3/2019 | Kim ..................... G02B 5/3083 |
| 2019/0107719 | A1 | 4/2019 | Edwin et al. |
| 2019/0187474 | A1 | 6/2019 | Bhargava et al. |
| 2019/0216307 | A1 | 7/2019 | Coon et al. |
| 2019/0227321 | A1* | 7/2019 | Lee ..................... G02B 27/0172 |
| 2020/0116995 | A1* | 4/2020 | Chi ..................... G02B 6/0035 |
| 2020/0150425 | A1 | 5/2020 | Hatzilias et al. |
| 2021/0041711 | A1* | 2/2021 | Sharp ................... G02B 27/286 |
| 2021/0080763 | A1* | 3/2021 | Sulai ................... G02B 27/283 |
| 2021/0278672 | A1 | 9/2021 | Messer et al. |
| 2021/0364799 | A1* | 11/2021 | Guo ................... G02B 27/0101 |
| 2021/0405402 | A1 | 12/2021 | Cheng et al. |

OTHER PUBLICATIONS

Azuma, "Predictive tracking for augmented reality." Dissertation for the degree of Doctor of Philosophy, University of North Carolina at Chapel Hill, Department of Computer Science, Feb. 1995, 262 pages.
Bimber et al., "Spatial Augmented Reality Merging Real and Virtual Worlds," A K Peters, Ltd. (ed.), 2005, 393 pages.
hitl.washington.edu [online], "Hardware," available on or before Oct. 13, 2005, via Internet Archive: Wayback Machine URL <https://web.archive.org/web/20051013062315/http://www.hitl.washington.edu:80/artoolkit/documentation/hardware.htm>, retrieved on Mar. 3, 2021, URL <http://www.hitl.washington.edu/artoolkit/documentation/hardware.htm>, 3 pages.
Jacob, "Eye Tracking in Advanced Interface Design," Virtual environments and advanced interface design, 1995, 258:288, 50 pages.
PCT Invitation to Pay Additional Fees in International Appln. No. PCT/US2020/055817, dated Dec. 9, 2020, 2 pages.
PCT Search Report and Written Opinion in International Appln. No. PCT/US2020/055817, dated Feb. 9, 2021, 10 pages.
Tanriverdi et al., "Interacting with Eye Movements in Virtual Environments," Proc. of the SIGCHI Conference on Human Factors in Computing Systems, 2000, pp. 265-272.
PCT Search Report and Written Opinion in International Appln No. PCT/US2021/021224, dated Jun. 2, 2021, 9 pages.
PCT Search Report and Written Opinion in International Appln No. PCT/US2021/039211, dated Sep. 30, 2021, 9 pages.
Rao et al., "Viewing angle controllable displays with a blue-phase liquid crystal cell," Optics Express, Feb. 2010, 18(3):3143-3148.
Yan et al., "Extended Kerr effect of polymer-stabilized blue-phase liquid crystals," Appl. Phys. Lett., 2010, 96(7):071105, 6 pages.

* cited by examiner

ATTENUATION OF LIGHT TRANSMISSION ARTIFACTS IN WEARABLE DISPLAYS

CROSS-REFERENCE TO RELATED APPLICATIONS

This application claims the benefit under 35 U.S.C. § 119(e) of U.S. Patent Application No. 62/916,350, entitled "Attenuation of Light Transmission Artifacts in Wearable Displays," filed Oct. 17, 2019, which is incorporated herein by reference in its entirety.

TECHNICAL FIELD

This disclosure relates to techniques for attenuation of light transmission artifacts in wearable displays.

BACKGROUND

Optical imaging systems, such as wearable display systems (e.g., wearable display headsets) can include one or more eyepieces that present projected images to a user. Eyepieces can be constructed using thin layers of one or more highly refractive materials. As examples, eyepieces can be constructed from one or more layers of highly refractive glass, silicon, metal, or polymer substrates.

Multiple eyepieces can be used in conjunction to project a simulated three-dimensional image. For example, multiple eyepieces—each having a different pattern—can be layered one atop another, and each eyepiece can project a different depth layer of a volumetric image. Thus, the eyepieces can collectively present the volumetric image to the user across three-dimensions. This can be useful, for example, in presenting the user with a "virtual reality" environment.

Optical elements in a wearable display system can also interact with ambient light, which is light from the environment that the user is in. For example, diffractive structures in a wearable display system can diffract ambient light incident on the wearable display at a high angle, which would ordinarily not enter the users field of view, into the field of view creating visible artifact that diminishes the user's experience.

SUMMARY

Wearable display systems are described that include angularly selective films to mitigate artifacts associated with ambient light incident of high incidence angles. For example, angularly selective films can utilize polarizers in combination with polarization adjusting elements for which the amount of adjustment varies depending on the angle of incidence of the light, to reduce transmission of light at certain incidence angles. In certain embodiments, the angularly selective film can include a dynamic element in which the transmission properties can be varied in response to certain stimuli, such as in response to an electric field.

In general, in a first aspect, the invention features a wearable display system, including an eyepiece stack having a world side and a user side opposite the world side, wherein during use a user positioned on the user side views displayed images delivered by the wearable display system via the eyepiece stack which augment the user's field of view of the user's environment. The wearable display system also includes an angularly selective film arranged on the world side of the of the eyepiece stack, the angularly selective film including a polarization adjusting film arranged between pair of linear polarizers, wherein the linear polarizers and polarization adjusting film significantly reduces transmission of visible light incident on the angularly selective film at large angles of incidence without significantly reducing transmission of light incident on the angularly selective film at small angles of incidence.

Embodiments of the wearable display system can include one or more of the following features and/or features of other aspects. For example, the pass axes of the two linear polarizers can be crossed.

In some embodiments, the polarization adjusting film rotates a polarization state of light transmitted by a first of the pair of linear polarizers on the world side of the polarization adjusting film. An amount of rotation of the polarization state can vary depending on an angle of incidence of light transmitted by the first of the pair of linear polarizers. The light transmitted having large angles of incidence can be rotated less than the light transmitted having small angles of incidence.

Unpolarized light of wavelength in a range from 420 nm to 680 nm incident of the angularly selective film with an angle of incidence between 35° and 65° can have a transmission efficiency less than 0.5%.

Unpolarized light of wavelength in a range from 420 nm to 680 nm incident of the angularly selective film with an angle of incidence between −32° and +32° can have a transmission efficiency greater than 45%.

For a D65 source, the angularly selective film can shift a (0.33, 0.33) CIE 1931 white point less than (+/−0.02, +/−0.02) for unpolarized light with an angle of incidence between −32° and +32°.

The angularly selective film can have an area greater than 10 mm×10 mm (e.g., 200 mm² or more, 500 mm² or more, 1,000 mm² or more, such as 2,500 mm² or more, e.g., greater than 50 mm×50 mm).

The polarization adjusting film can include at least one layer of a birefringent material. For example, the at least one layer of birefringent material can include a C-plate. In some embodiments, the at least one layer of birefringent material comprises a pair of quarter wave plates, the quarter wave plates being disposed on opposite sides of the C-plate. Each quarter wave plate can be arranged relative to a corresponding one of the linear polarizers to form a circular polarizer.

The at least one layer of birefringent material can include at least one quarter wave plate.

The polarization adjusting film can be a first polarization adjusting film and the angularly selective film can further include a second polarization adjusting film and a third linear polarizer, the second polarization adjusting film being arranged between pair of linear polarizers and the third linear polarizer. The first and second polarization adjusting films can each be composed of one or more layers of birefringent materials. The one or more layers of birefringent materials of the first and second polarization adjusting films can each include a C-plate. The one or more layers of birefringent materials of the first and second polarization adjusting films can each include a pair of quarter wave plates arranged on opposite sides of the corresponding C-plate.

The angularly selective film can include two or more stages, each stage including a polarization adjusting film arranged between a pair of linear polarizers. Adjacent stages can share a linear polarizer.

The angularly selective film can further include a switchable element having variable optical properties. The switchable element can include a liquid crystal layer between a pair of polarizers, wherein light transmission through the switchable element is variable. The switchable element can include multiple pixels, the optical properties of each pixel being separately variable.

In general, in another aspect, the invention features methods for displaying an image using a wearable display system, the methods including directing display light from a display towards a user through an eyepiece to project images in the user's field of view and transmitting ambient light from the user's environment through the eyepiece. Transmitting the ambient light includes attenuating light incident on the eyepiece from the environment as a function of an angle of incidence of the ambient light on the eyepiece, the ambient light incident on the eyepiece at angles of incidence of 35° or more being more strongly attenuated than the ambient light incident on the eyepiece at angles of incidence of 35° or less.

Implementations of the methods can include one or more of the following features and/or features of other aspects. For examples, attenuating the ambient light can include polarizing the ambient light to provide polarized light and modulating a polarization state of the polarized light as a function of angle of incidence of the ambient light. Modulating the polarization state of the polarized light can include rotating the polarization state. An amount of rotation of the polarization state can vary depending on the angle of incidence of the ambient light. For example, the amount of rotation can decrease for increasing angles of incidence. In some embodiments, attenuating the ambient light further includes directing the polarized light through a second polarizer.

Transmission of ambient light can be 1% or less (e.g., 0.5% or less, 0.3% or less, 0.2% or less, 0.1% or less) for at least one angle of incidence greater than 30° (e.g., 35° or greater, 40° or greater, 45° or greater, 50° or greater). In some embodiments, transmission of ambient light is 1% or less for at least one angle of incidence greater than 50°. In certain embodiments, transmission of ambient light is 1% or less for at least one angle of incidence in a range from 60° to 80°.

Directing the display light can include waveguiding display light through a waveguide in the eyepiece and diffracting the waveguided display light towards the user.

The method can include varying an attenuation of the transmitted ambient light in response to a signal from the wearable display system. For example, the attenuation can be varied by different amounts across the eyepiece. In some embodiments, the attenuation is varied using a liquid crystal element.

Among other advantages, implementations of the invention can reduce undesirable optical artifacts (e.g., rainbow effects) in certain wearable displays associated with stray ambient light interacting with grating structures in the displays. For example, waveguide based wearable displays (e.g., for AR/MR applications) that employ surface relief gratings can diffract stray ambient light into the eyebox of the display, resulting in unwanted artifacts in the user's field of view, diminishing the user's experience. Implementations of the invention can significantly reduce such artifacts without significantly impacting the user's viewed field.

Implementations can attenuate the transmission of ambient light based on its angle of incidence. For instance, a film that selectively attenuates light for angles of incidence larger than the user's field-of-view can mitigate the visibility of the artifacts generated by the diffractive near-eye-display without sacrificing the transmission of the user's view of the world.

The details of one or more embodiments are set forth in the accompanying drawings and the description below. Other features and advantages will be apparent from the description and drawings, and from the claims.

DETAILED DESCRIPTION

Figure 1:
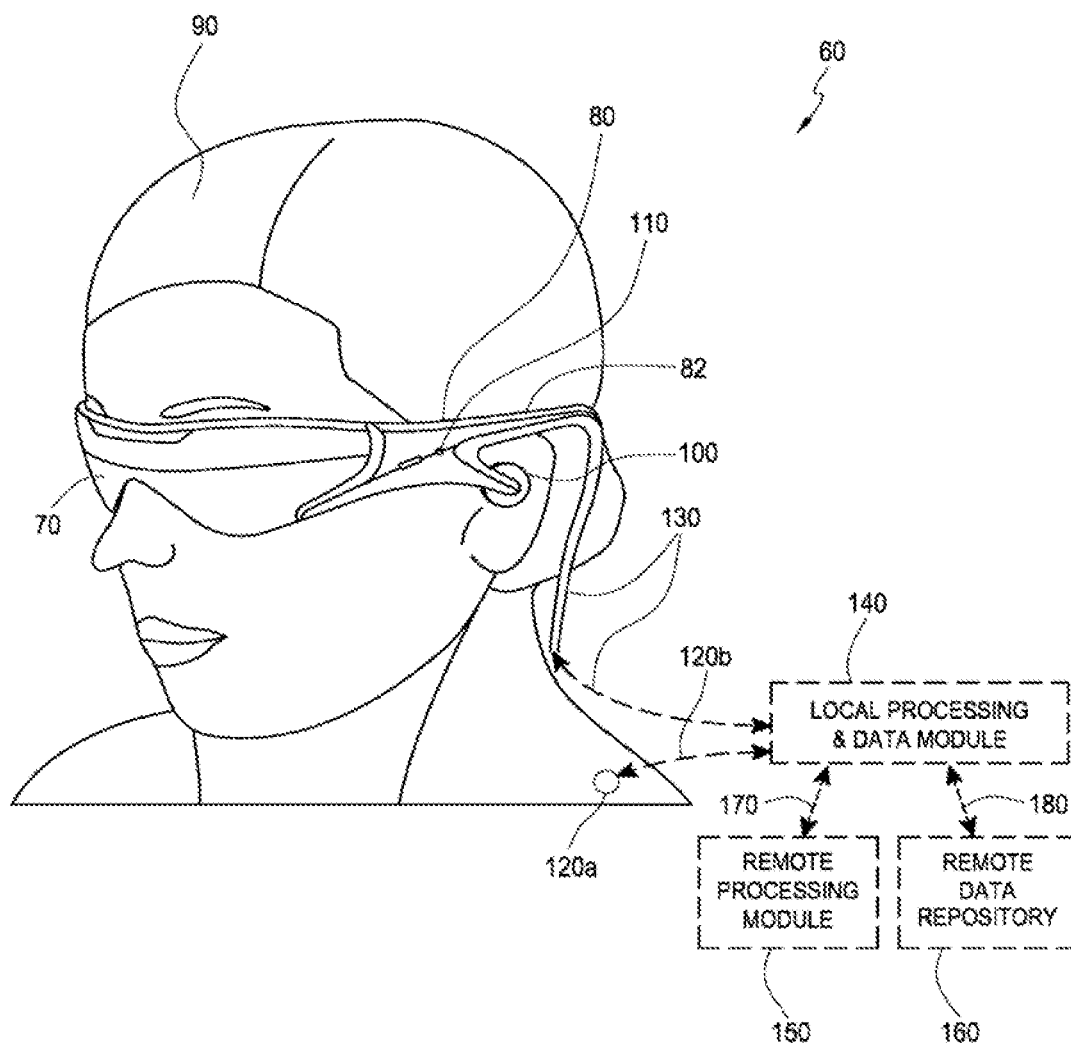
FIG. 1 shows an example of a wearable display system.

FIG. 1 illustrates an example wearable display system 60 that includes a display or eyepiece 70, and various mechanical and electronic modules and systems to support the functioning of that display 70. The display 70 is housed in a frame 80, which is wearable by a display system user 90 and which is configured to position the display 70 in front of the eyes of the user 90. The display 70 may be considered eyewear in some embodiments. In some embodiments, a speaker 100 is coupled to the frame 80 and is positioned adjacent the ear canal of the user 90. The display system may also include one or more microphones 110 to detect sound. The microphone 110 can allow the user to provide inputs or commands to the system 60 (e.g., the selection of voice menu commands, natural language questions, etc.), and/or can allow audio communication with other persons (e.g., with other users of similar display systems). The microphone 110 can also collect audio data from the user's surroundings (e.g., sounds from the user and/or environment). In some embodiments, the display system may also include a peripheral sensor 120 a, which may be separate from the frame 80 and attached to the body of the user 90 (e.g., on the head, torso, an extremity, etc.). The peripheral sensor 120 a may acquire data characterizing the physiological state of the user 90 in some embodiments.

The display 70 is operatively coupled by a communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or removably attached to the user 90 (e.g., in a backpack-style configuration or in a belt-coupling style configuration). Similarly, the sensor 120 a may be operatively coupled by communications link 120 b (e.g., a wired lead or wireless connectivity) to the local processor and data module 140. The local processing and data module 140 may include a hardware processor, as well as digital memory, such as non-volatile memory (e.g., flash memory or a hard disk drive), both of which may be utilized to assist in the processing, caching, and storage of data. The data may include data 1) captured from sensors (which may be, e.g., operatively coupled to the frame 80 or otherwise attached to the user 90), such as image capture devices (e.g., cameras), microphones, inertial measurement units, accelerometers, compasses, GPS units, radio devices, gyros, and/or other sensors disclosed herein; and/or 2) acquired and/or processed using a remote processing module 150 and/or a remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and the remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone devices that communicate with the local processing and data module 140 by wired or wireless communication pathways.

The remote processing module 150 may include one or more processors to analyze and process data, such as image and audio information. In some embodiments, the remote data repository 160 may be a digital data storage facility, which may be available through the internet or other networking configuration in a "cloud" resource configuration. In some embodiments, the remote data repository 160 may include one or more remote servers, which provide information (e.g., information for generating augmented reality content) to the local processing and data module 140 and/or the remote processing module 150. In other embodiments, all data is stored and all computations are performed in the local processing and data module, allowing fully autonomous use from a remote module.

Figure 2A:
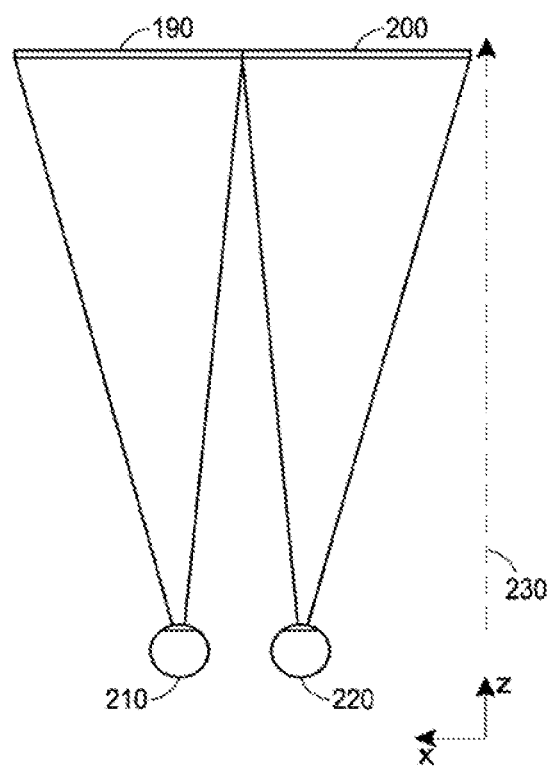
FIG. 2A shows a conventional display system for simulating three-dimensional image data for a user.

The perception of an image as being "three-dimensional" or "3-D" may be achieved by providing slightly different presentations of the image to each eye of the user. FIG. 2A illustrates a conventional display system for simulating three-dimensional image data for a user. Two distinct images 190, 200—one for each eye 210, 220—are output to the user. The images 190, 200 are spaced from the eyes 210, 220 by a distance 230 along an optical or z-axis that is parallel to the line of sight of the user. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

However, the human visual system is complicated and providing a realistic perception of depth is challenging. For example, many users of conventional "3-D" display systems find such systems to be uncomfortable or may not perceive a sense of depth at all. Objects may be perceived as being "three-dimensional" due to a combination of vergence and accommodation. Vergence movements (e.g., rotation of the eyes so that the pupils move toward or away from each other to converge the respective lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, under normal conditions, a change in vergence will trigger a matching change in accommodation of lens shape and pupil size. As noted herein, many stereoscopic or "3-D" display systems display a scene using slightly different presentations (and, so, slightly different images) to each eye such that a three-dimensional perspective is perceived by the human visual system. Such systems can be uncomfortable for some users, however, since they simply provide image information at a single accommodated state and work against the "accommodation-vergence reflex." Display systems that provide a better match between accommodation and vergence may form more realistic and comfortable simulations of three-dimensional image data.

Figure 2B:
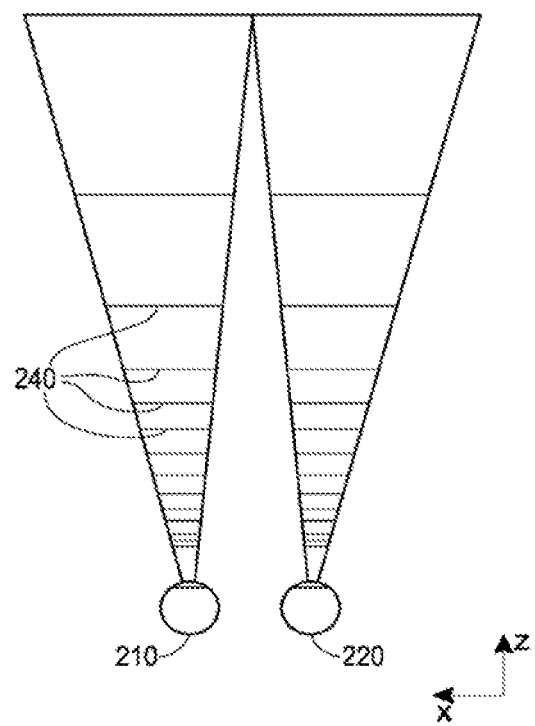
FIG. 2B shows aspects of an approach for simulating three-dimensional image data using multiple depth planes.

FIG. 2B illustrates aspects of an approach for simulating three-dimensional image data using multiple depth planes. With reference to FIG. 2B, the eyes 210, 220 assume different accommodated states to focus on objects at various distances on the z-axis. Consequently, a particular accommodated state may be said to be associated with a particular one of the illustrated depth planes 240, which has an associated focal distance, such that objects or parts of objects in a particular depth plane are in focus when the eye is in the accommodated state for that depth plane. In some embodiments, three-dimensional image data may be simulated by providing different presentations of an image for each of the eyes 210, 220, and also by providing different presentations of the image corresponding to multiple depth planes. While the respective fields of view of the eyes 210, 220 are shown as being separate for clarity of illustration, they may overlap, for example, as distance along the z-axis increases. In addition, while the depth planes are shown as being flat for ease of illustration, it will be appreciated that the contours of a depth plane may be curved in physical space, such that all features in a depth plane are in focus with the eye in a particular accommodated state.

Figure 3A:
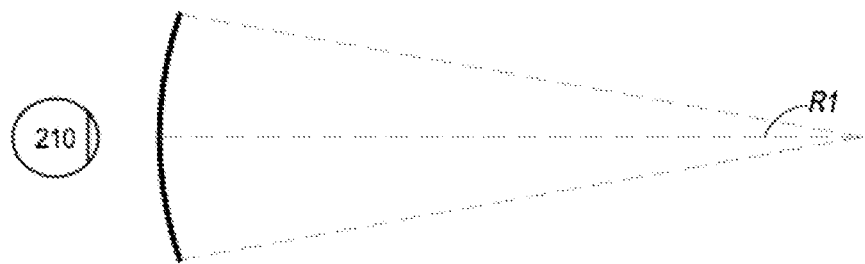
FIGS. 3A-3C show relationships between radius of curvature and focal radius.
Figure 3B:
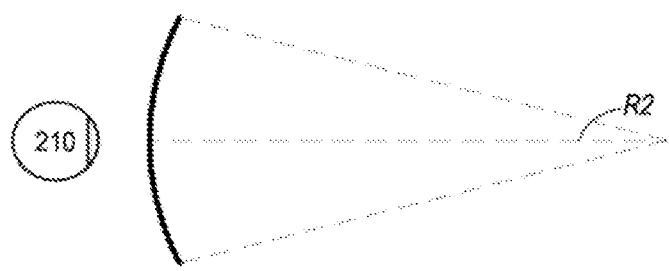
Figure 3C:
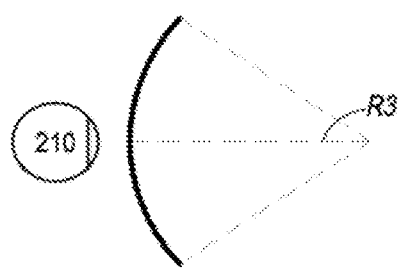

The distance between an object and an eye 210 or 220 may also change the amount of divergence of light from that object, as viewed by that eye. FIGS. 3A-3C illustrate relationships between distance and the divergence of light rays. The distance between the object and the eye 210 is represented by, in order of decreasing distance, R1, R2, and R3.

As shown in FIGS. 3A-3C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the user's eye 210. While only a single eye 210 is illustrated for clarity of illustration in FIGS. 3A-3C and other figures herein, it will be appreciated that the discussions regarding the eye 210 may be applied to both eyes 210 and 220 of a user.

A highly believable simulation of perceived depth may be achieved by providing, to the eye, different presentations of an image corresponding to each of a limited number of depth planes. The different presentations may be separately focused by the user's eye, thereby helping to provide the user with depth cues based on the amount of accommodation of the eye required to bring into focus different image features for the scene located on different depth planes and/or based on observing different image features on different depth planes being out of focus.

Figure 4:
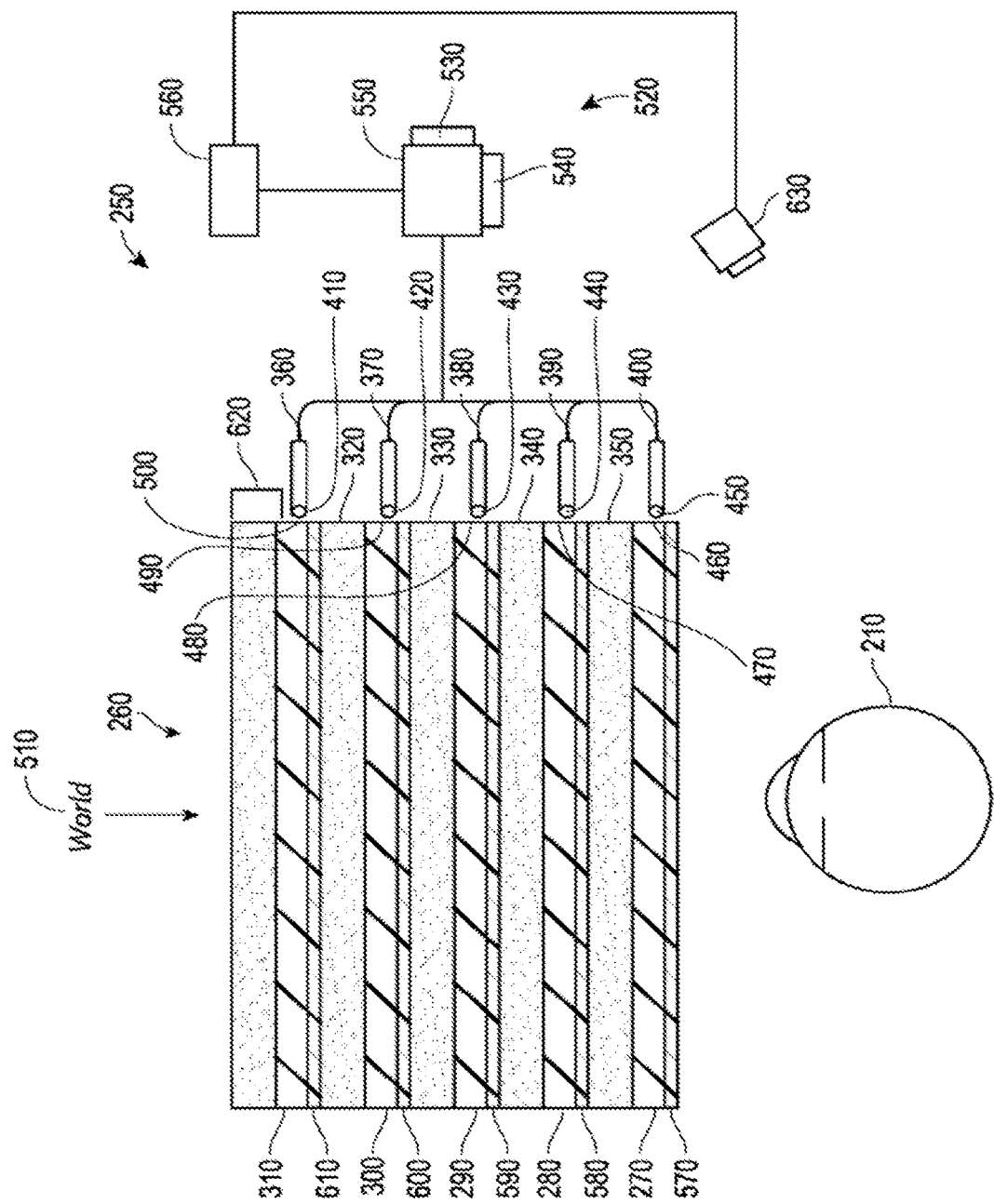
FIG. 4 shows an example of a waveguide stack for outputting image information to a user in an AR eyepiece.

FIG. 4 illustrates an example of a waveguide stack for outputting image information to a user in an AR eyepiece. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 1, with FIG. 4 schematically showing some parts of that system 60 in greater detail. For example, the waveguide assembly 260 may be part of the display 70 of FIG. 1. It will be appreciated that the display system 250 may be considered a light field display in some embodiments.

The waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of each respective image injection device 360, 370, 380, 390, 400 and is injected into a corresponding input surface 460, 470, 480, 490, 500 of the respective waveguides 270, 280, 290, 300, 310, in some embodiments, the each of the input surf aces 460, 470, 480, 490, 500 may be an edge of a corresponding waveguide, or may be part of a major surface of the corresponding waveguide (that is, one of the waveguide surfaces directly facing the world 510 or the user's eye 210). In some embodiments, a beam of light (e.g., a collimated beam) may be injected into each waveguide and may be replicated, such as by sampling into beamlets by diffraction, in the waveguide and then directed toward the eye 210 with an amount of optical power corresponding to the depth plane associated with that particular waveguide. In some embodiments, a single one of the image injection devices 360, 370, 380, 390, 400 may be associated with, and inject light into, a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may transmit image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors.

In some embodiments, the light injected into the waveguides 270, 280, 290, 300, 310 is provided by a light projector system 520, which includes a light module 530, which may include a light source or light emitter, such as a light emitting diode (LED). The light from the light module 530 may be directed to, and modulated by, a light modulator 540 (e.g., a spatial light modulator), via a beamsplitter (BS) 550. The light modulator 540 may spatially and/or temporally change the perceived intensity of the light injected into the waveguides 270, 280, 290, 300, 310. Examples of spatial light modulators include liquid crystal displays (LCD), including a liquid crystal on silicon (LCOS) displays, and digital light processing (DLP) displays.

In some embodiments, the light projector system 520, or one or more components thereof, may be attached to the frame 80 (FIG. 1). For example, the light projector system 520 may be part of a temporal portion (e.g., ear stem 82) of the frame 80 or disposed at an edge of the display 70. In some embodiments, the light module 530 may be separate from the BS 550 and/or light modulator 540.

In some embodiments, the display system 250 may be a scanning fiber display comprising one or more scanning fibers to project light in various patterns (e.g., raster scan, spiral scan, Lissajous patterns, etc.) into one or more waveguides 270, 280, 290, 300, 310 and ultimately into the eye 210 of the user. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. One or more optical fibers may transmit light from the light module 530 to the one or more waveguides 270, 280, 290, 300, and 310. In addition, one or more intervening optical structures may be provided between the scanning fiber, or fibers, and the one or more waveguides 270, 280, 290, 300, 310 to, for example, redirect light exiting the scanning fiber into the one or more waveguides 270,280,290,300,310.

A controller 560 controls the operation of the stacked waveguide assembly 260, including operation of the image injection devices 360, 370, 380, 390, 400, the light source 530, and the light modulator 540. In some embodiments, the controller 560 is part of the local data processing module 140. The controller 560 includes programing (e.g., instructions in a non-transitory medium) that regulates the timing and provision of image information to the waveguides 270, 280, 290, 300, 310. In some embodiments, the controller may be a single integral device, or a distributed system connected by wired or wireless communication channels. The controller 560 may be part of the processing modules 140 or 150 (FIG. 1) in some embodiments.

The waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be output by the waveguide at locations at which the light propagating in the waveguide strikes a light extracting optical element. The out-coupling optical elements 570, 580, 590, 600, 610 may be, for example, diffractive optical features, including diffractive gratings, as discussed further herein. While the out-coupling optical elements 570, 580, 590, 600, 610 are illustrated as being disposed at the bottom major surfaces of the waveguides 270, 280, 290, 300, 310, in some embodiments they may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

Each waveguide 270, 280, 290, 300, 310 may output light to form an image corresponding to a particular depth plane. For example, the waveguide 270 nearest the eye may deliver collimated beams of light to the eye 210. The collimated beams of light may be representative of the optical infinity focal plane. The next waveguide up 280 may output collimated beams of light which pass through the first lens 350 (e.g., a negative lens) before reaching the eye 210. The first lens 350 may add a slight convex wavefront curvature to the collimated beams so that the eye/brain interprets light coming from that waveguide 280 as originating from a first focal plane closer inward toward the eye 210 from optical infinity. Similarly, the third waveguide 290 passes its output light through both the first lens 350 and the second lens 340 before reaching the eye 210. The combined optical power of the first lens 350 and the second lens 340 may add another incremental amount of wavefront curvature so that the eye/brain interprets light coming from the third waveguide 290 as originating from a second focal plane that is even closer inward from optical infinity than was light from the second waveguide 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate optical power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may output images set to the same depth plane, or multiple subsets of the waveguides 270, 280, 290, 300, 310 may output images set to the same plurality of depth planes, with one set for each depth plane. This can provide advantages for forming a tiled image to provide an expanded field of view at those depth planes.

The out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features with a diffractive efficiency sufficiently low such that only a portion of the power of the light in a beam is re-directed toward the eye 210 with each interaction, while the rest continues to move through a waveguide via TIR. Accordingly, the exit pupil of the light module 530 is replicated across the waveguide to create a plurality of output beams carrying the image information from light source 530, effectively expanding the number of locations where the eye 210 may intercept the replicated light source exit pupil. These diffractive features may also have a variable diffractive efficiency across their geometry to improve uniformity of light output by the waveguide.

In some embodiments, one or more diffractive features may be switchable between "on" states in which they actively diffract, and "off" states in which they do not significantly diffract. For instance, a switchable diffractive element may include a layer of polymer dispersed liquid crystal in which microdroplets form a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and IR light cameras)

may be provided to capture images of the eye 210, parts of the eye 210, or at least a portion of the tissue surrounding the eye 210 to, for example, detect user inputs, extract biometric information from the eye, estimate and track the gaze direction of the eye, to monitor the physiological state of the user, etc. In some embodiments, the camera assembly 630 may include an image capture device and a light source to project light (e.g., IR or near-IR light) to the eye, which may then be reflected by the eye and detected by the image capture device. In some embodiments, the light source includes light emitting diodes ("LEDs"), emitting in IR or near-IR. In some embodiments, the camera assembly 630 may be attached to the frame 80 (FIG. 1) and may be in electrical communication with the processing modules 140 or 150, which may process image information from the camera assembly 630 to make various determinations regarding, for example, the physiological state of the user, the gaze direction of the wearer, iris identification, etc. In some embodiments, one camera assembly 630 may be utilized for each eye, to separately monitor each eye.

Figure 5:
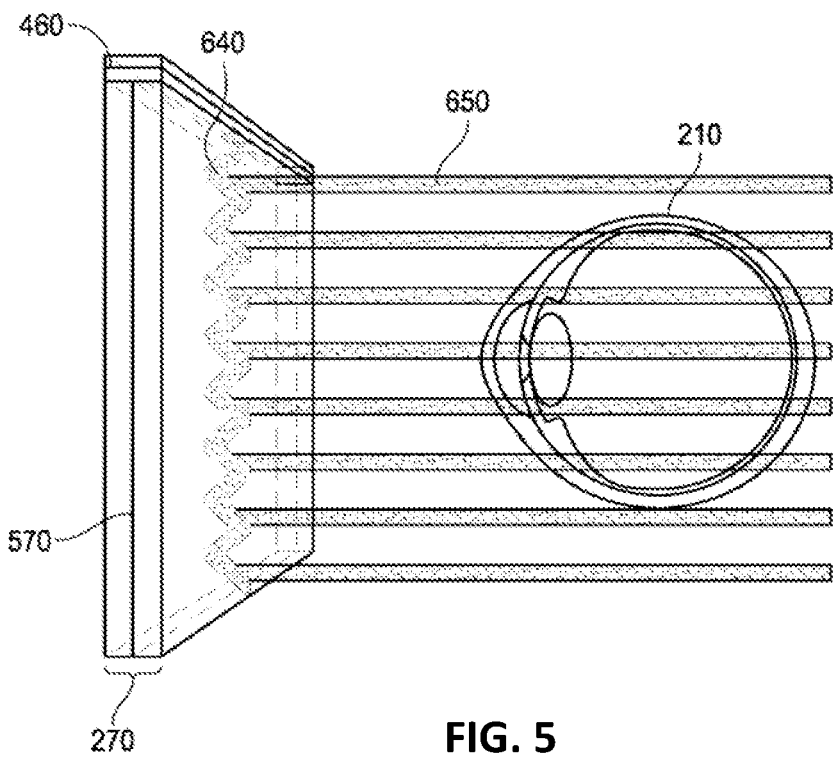
FIGS. 5 and 6 show examples of exit beams outputted by a waveguide.
Figure 6:
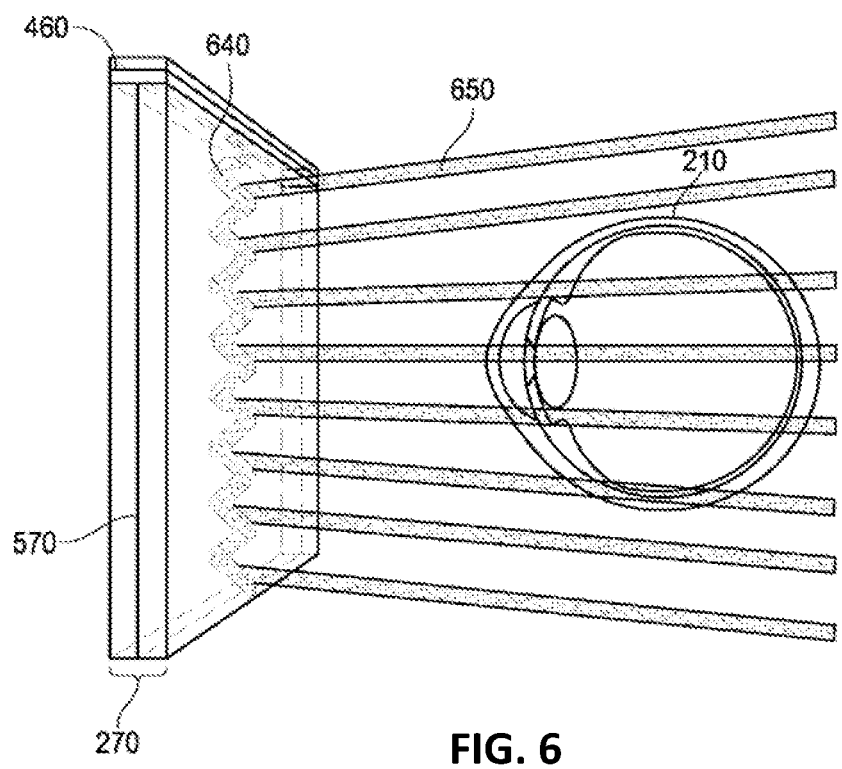

FIG. 5 illustrates an example of exit beams output by a waveguide. One waveguide is illustrated (with a perspective view), but other waveguides in the waveguide assembly 260 (FIG. 4) may function similarly. Light 640 is injected into the waveguide 270 at the input surface 460 of the waveguide 270 and propagates within the waveguide 270 by TIR. Through interaction with diffractive features, light exits the waveguide as exit beams 650. The exit beams 650 replicate the exit pupil from a projector device which projects images into the waveguide. Any one of the exit beams 650 includes a sub-portion of the total energy of the input light 640. And in a perfectly efficient system, the summation of the energy in all the exit beams 650 would equal the energy of the input light 640. The exit beams 650 are illustrated as being substantially parallel in FIG. 6 but, as discussed herein, some amount of optical power may be imparted depending on the depth plane associated with the waveguide 270. Parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, as shown in FIG. 6, which would require the eye 210 to accommodate to a closer distance to bring it into focus on the retina and would be interpreted by the brain as light from a distance closer to the eye 210 than optical infinity.

Additional information regarding wearable display systems (e.g., including optical elements used in wearable display systems) can be found in U.S. Patent Publication No. U.S. 2019/0187474 A1, filed Dec. 14, 2018, and entitled "EYEPIECES FOR AUGMENTED REALITY DISPLAY SYSTEM," the contents of which are incorporated by reference in their entirety.

Figures 7A, 7B:
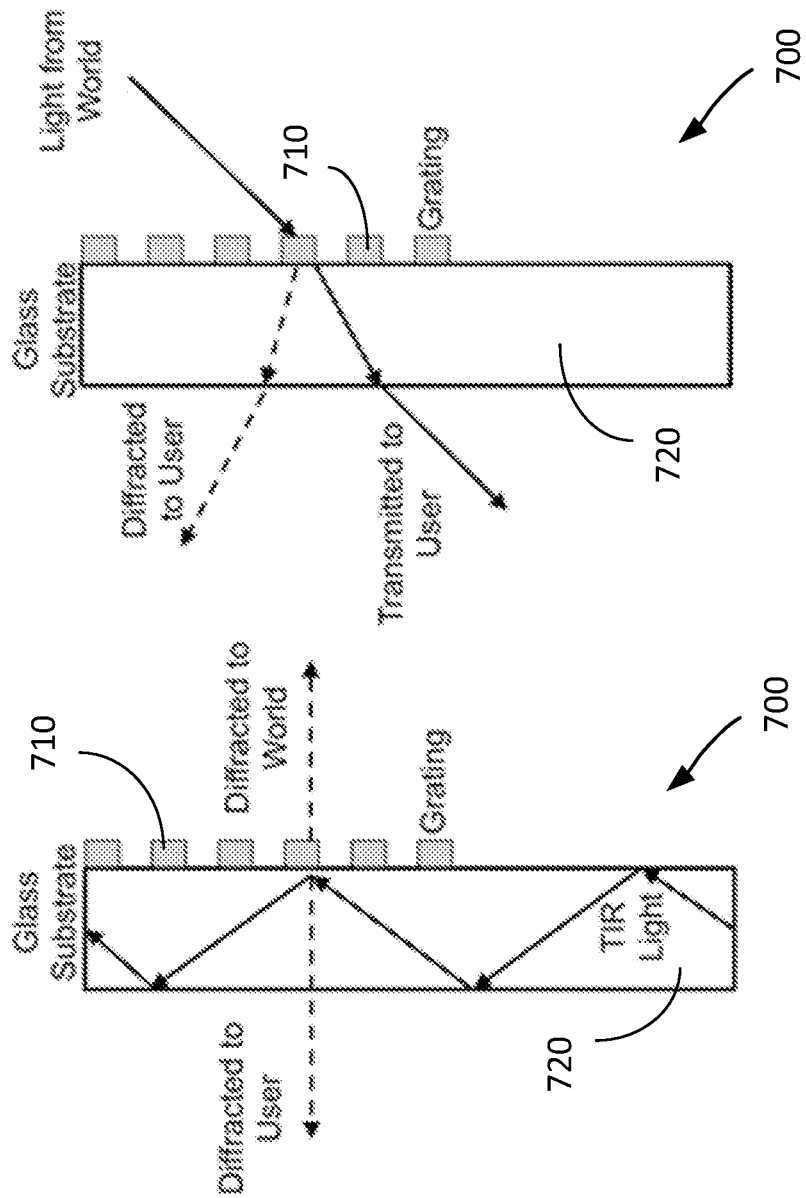
FIGS. 7A and 7B are schematic diagrams illustrating light paths through a display combiner having a surface relief grating.

As noted above, wearable display system 60 includes one or more optical elements having one or more grating structures that enhance an optical performance of the wearable display system. For example, referring to FIGS. 7A and 7B, a diffractive relief structure, grating 710, is used with a near-eye display combiner 700 (e.g., a stacked waveguide assembly as described above) as an exit pupil expander (EPE), increasing the size of the wearable display system's exit pupil. As illustrated in FIG. 7A, combiner 700 includes a waveguide 720 (e.g., a glass substrate) that guides edge-coupled light via total-internal-reflection (TIR) along its length while grating 710 diffracts incident guided light so that at least some of the light is extracted from light guide 710 towards the user of the display system.

Referring specifically to FIG. 7B, ambient light from the user's environment is also incident on display combiner 700 from the "world" side. This light interacts with grating 710 and at least some of this light can be diffracted into the user's field of view. When viewed by the user through the EPE, the light diffracted from the world can appear as an undesirable image artifact. The angles-of-incidence which generate artifacts in the user's field-of-view generally depends on the design on the display combiner. For diffractive waveguide based display combiners, large angles-of-incidence often result in stray light paths nearest the center of the user's world field-of-view.

Figure 8B:
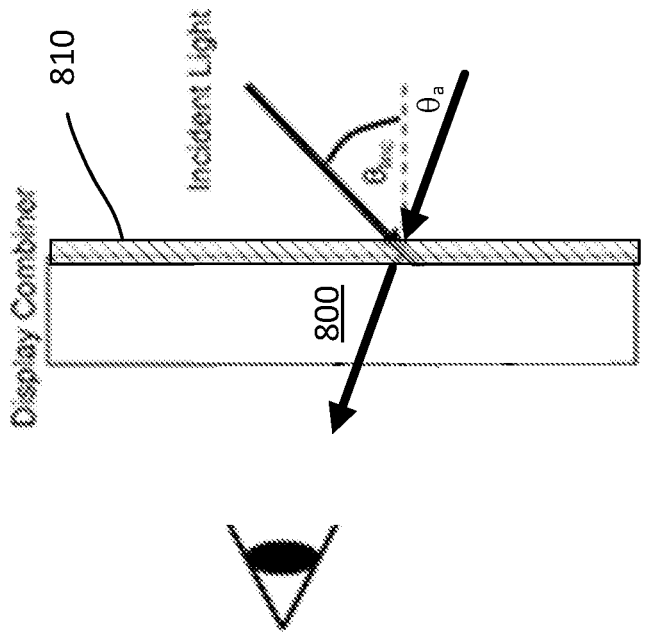
FIGS. 8A and 8B are schematic diagrams comparting light transmission through a display combiner with and without an angularly selective film.
Figure 8A:
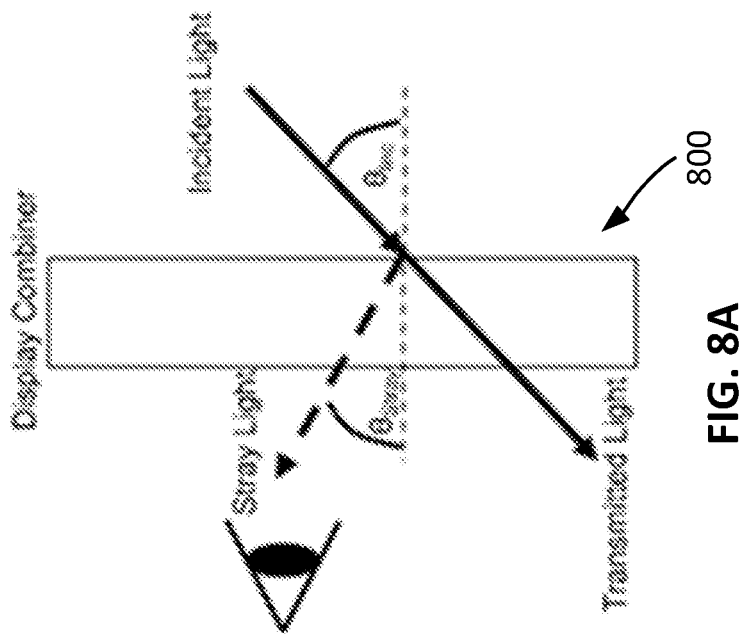

This effect is further illustrated in FIG. 8A, which shows a display combiner 800. Ambient light is incident on a front surface of display combiner 800 at an incident angle $\theta_{inc}$. At least some of the incident light is transmitted through the grating and the combiner as illustrated. However, display combiner 800 supports a grating (not shown) that diffracts at least some of the incident light toward the user. This light, labeled stray light, diffracts at an angle $\theta_{stray}$.

Referring to FIG. 8B, an angularly selective film 810 can be applied to (e.g., laminated onto) display combiner 800 to reduce stray light artifacts associate with ambient light. Generally, the transmission of light through film 810 depends on the angle of incidence of the light on the film. As illustrated, film 810 reduces (e.g., blocks) transmission of light having an angle of incident $\theta_{inc}$, that is relatively high (e.g., 30° or more, 35° or more, 40° or more, 45° or more, e.g., such as a user would experience from overhead lighting in indoor environments) but transmits light having a lower angle of incidence, $\theta_a$ (e.g. "world light" seen by the wearer in the core field of view of the device), The angularly selective film can perform this function over a broad range of wavelengths, e.g., over the operative wavelength range of the display system, such as from 420 nm to 680 nm.

The transmission efficiency for incident light generally varies as a function of incident angle from relatively high transmission efficiency (e.g., 40% or more, 45% or more) to a relatively low transmission efficiency (e.g., less than 1%, less than 0.5%). Transmission efficiency refers to the relative intensity of light transmitted at a particular wavelength. In some embodiments, unpolarized light of wavelength in a range from 420 nm to 680 nm incident of the angularly selective film with an angle of incidence between 35° and 65° has a transmission efficiency less than 0.5%. In certain embodiments, unpolarized light of wavelength in a range from 420 nm to 680 nm incident of the angularly selective film with an angle of incidence between −32° and +32° has a transmission efficiency greater than 45%.

The angularly selective film can also have a relatively small impact on the color of images viewed through the film. For example, for a D65 source, the angularly selective film can shift a (0.33, 0.33) CIE 1931 white point less than (+/−0.02, +/−0.02) (e.g., (+/−0.01, +/−0.01) or less) for unpolarized light with an angle of incidence between −32° and +32°.

Transmission of the angularly selective film can also be characterized by attenuation, which can be high for relatively high incident angles (e.g., 10 dB or more, 15 dB or more, 20 dB or more, 25 dB or more, 30 dB or more). Light at lower incident angles, such as 25° or less (e.g., 20° or less, 15° or less, 10° or less) can experience very low levels of attenuation (e.g., 2 dB or less, 1 dB or less).

Generally, angularly selective film 810 can be relatively thin. For example, film 810 can have a total thickness in a range from 500 microns to 2,000 microns. Accordingly, the benefits of using the angularly selective film can be achieved without adding significant bulk to the wearable display system.

In some embodiments, angularly selective film 810 is a film stack that includes a polarization adjusting film arranged between pair of polarizer films (e.g., linear polarizers). The polarizer films and polarization adjusting film significantly reduces transmission of visible light incident on angularly selective film 810 at large angles of incidence without significantly reducing transmission of light incident on the angularly selective film at small angles of incidence.

In general, the configuration of the two polarizers and the polarization adjusting film can vary to provide a desired level of transmission variation over an angular incidence range of interest (e.g., from −75° to +75°). In some embodiments, the polarizers are linear polarizers and the pass axes of the two linear polarizers can be crossed a at 90°).

Generally, the polarization adjusting film includes one or more birefringent layers that are designed rotate a polarization state of light transmitted by a first of the pair of linear polarizers incident from the world side. The birefringent layers can include A-plates, in which an extraordinary axis of the birefringent material is parallel to a plane of the layer, (e.g., a quarter waveplate (QW) and/or C-plates, in which an extraordinary axis of the birefingent material is perpendicular to the plane of the layer, and example arrangements are shown below. More generally, birefringent layers can include uniaxial (e.g., as A-plates or C-plates) or biaxial birefringent materials.

Typically, the amount that the polarization adjusting layer rotates the polarization state varies depending on the configuration of the polarization adjusting layer and depending on an angle of incidence of light transmitted by the first of the pair of linear polarizers. In some embodiments, the light transmitted having large angles of incidence (e.g., 35° or more) is rotated less than the light transmitted having small angles of incidence (e.g., less than 35°). For example, where the polarizers are crossed linear polarizers, the greater the amount of rotation, up to 90°), the greater then transmission efficiency of the film. In such cases, greater rotation for on-axis light compared to light at larger incident angles, is desirable. Conversely, in some embodiments, the polarizer axes are parallel and the polarization adjusting film rotates on-axis light less than light at larger incident angles.

Generally, the angularly selective film is sized appropriately to cover at least a portion of the eyepiece of the wearable display system. For example, in some embodiments, the angularly selective film can have an area greater than 50 mm×50 mm.

Figure 9:
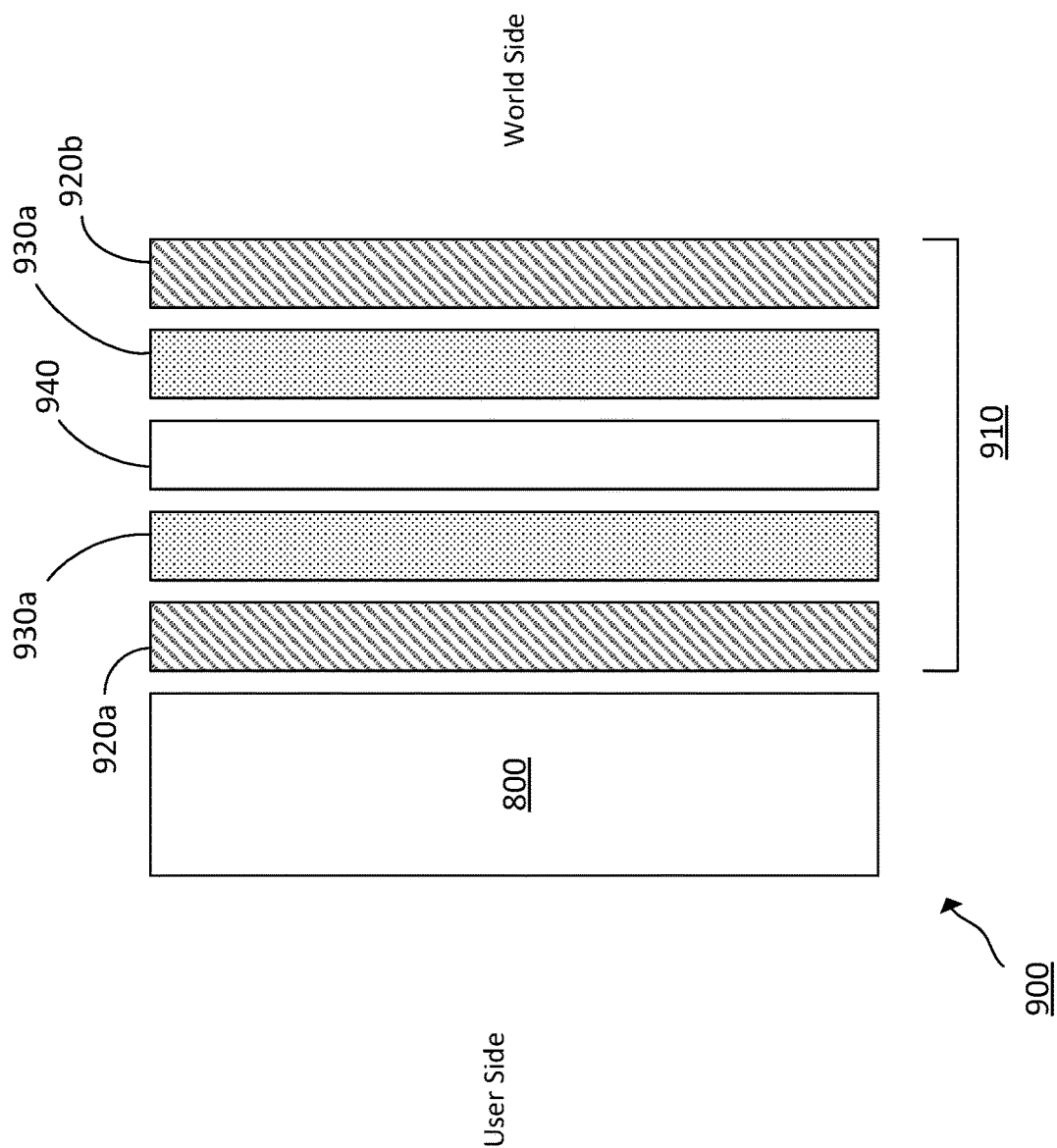
FIG. 9 is a schematic diagram of an eyepiece with a display combiner and an example of an angularly selective film.

Turning now to specific examples of angularly selective films and with reference to FIG. 9, an eyepiece 900 for a wearable display system includes display combiner 800 and a film stack 910 that operates as an angularly selective film. Stack 910 includes a pair of linear polarizers 920a and 920b. Between the linear polarizers, stack 910 includes a pair of quarter waveplates (QWs) 930a and 930b on either side of a C-plate 940.

The fast axes of the waveplates 930a and 930b are oriented at approximately 45° to the pass axes of linear polarizers 920a and 920b, respectively, so that the combination of linear polarizer 920b and QW 930b convert unpolarized light incident from the world side to substantially circularly polarized light (i.e., the combination behaves as a circular polarizer). The combination of QW 930a and linear polarizer 920a behave similarly. Note the handedness of each circular polarizer are the same.

C-plate 940 has zero retardance for normally incident light but has non-zero retardance for obliquely incident light. Without wishing to be bound by theory, the retardance of a C-plate as a function of incident angle can be given by: $\Gamma = n_o k_o d \sqrt{(1-\sin^2\theta/n_e^2)-(1-\sin^2\theta/n_o^2)}$, where $n_o$ is the ordinary refractive index of the C-plate, $n_e$ is the extraordinary refractive index of the C-plate, $\theta$ is the angle of incidence with respect to the normal to the C-plate interface, $k_o = 2\pi/\lambda$ is the wavenumber of the incident light, $\lambda$ is the wavelength of incident light, and d is the thickness of the C-plate. By using circularly polarized light, the excitation of the ordinary and extraordinary modes in the C-plate for all angles of incidence is roughly equal. This leads to transmission from the input circular polarization state into the same circular polarization state at the output of $T=\cos^2(\Gamma/2)$.

Figure 10:
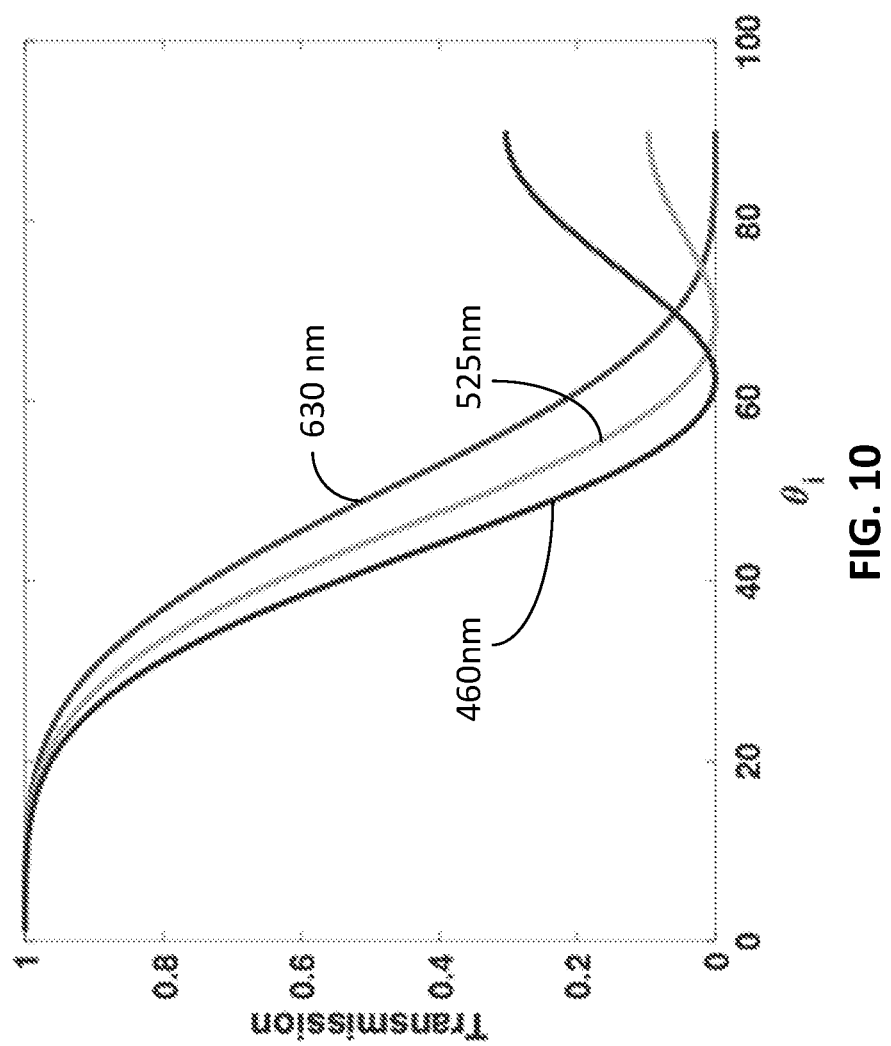
FIG. 10 is a plot showing transmission as a function of incident light angle through an example of an angularly selective film.

An example of transmission as a function of incident angle for stack 910 is shown in FIG. 10. Here, transmission as a function of incident angle is shown for a C-plate example with $n_o=1.5236$, $n_e=1.52$, and d=153 µm at three different wavelengths. Transmission, here, is normalized to unity for on-axis light and remains at 1 or close to 1 out to approximately 20°, after which it declines monotonically to zero between 60° and 80°, depending on the wavelength. For shorter wavelengths (e.g., 460 nm and 525 nm), the transmission increases as angles of incidence increase out to 90°.

While FIG. 9 shows an example of an angularly selective film that includes birefringent layers between two linear polarizers, implementations with additional layers are possible. For example, FIG. 10 shows an eyepiece 100 that includes a film stack 1010 applied to the world side of display combiner 800. Film stack 1010 includes three linear polarizers 1020a, 1020b, and 1020c. A first polarization adjustment stack is arranged between polarizers 1020a and 1020b. This stack includes a pair of QWs 1030a and 1130b on either side of a C-plate 1040a. A second polarization adjustment stack is arranged between polarizers 1020b and 1020c. This stack includes QWs 1030c and 1030d on either side of a C-plate 1040b. Effectively, stack 1010 performs like two stacks 910 stacked together.

Stack 910 can be considered a single stage arrangement, and stack 1010 a double stage. Generally, additional stages can be added. Without wishing to be bound by theory, several stages may be used in series to provide a different transmission response $T=\cos^2(\Gamma_1/2)\cos^2(\Gamma_2/2) \ldots \cos^2(\Gamma_n/2)$ where $\Gamma_n$ is the retardation of the nth stage.

Figure 11:
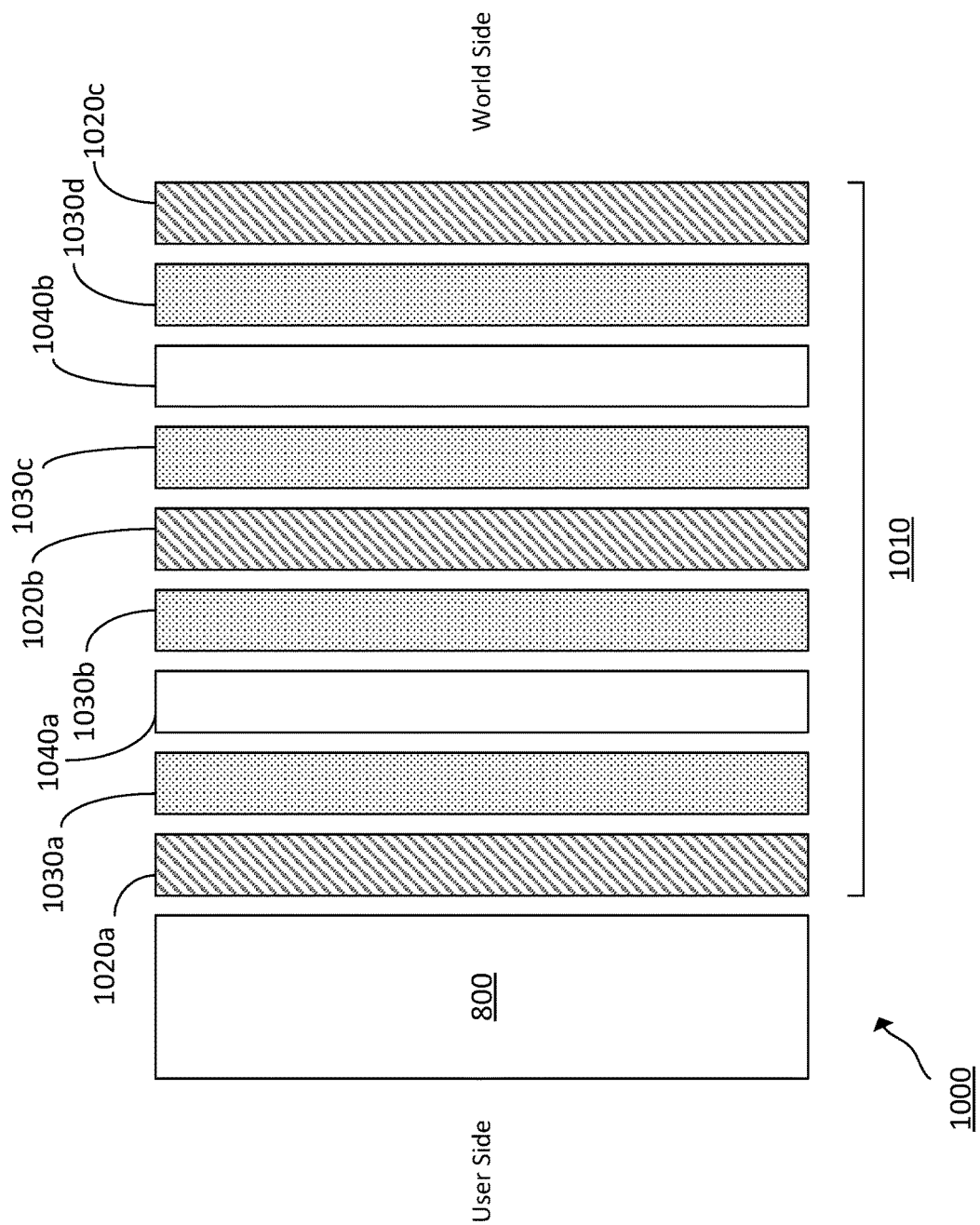
FIG. 11 is a schematic diagram of an eyepiece with a display combiner and another example of an angularly selective film.
Figure 12:
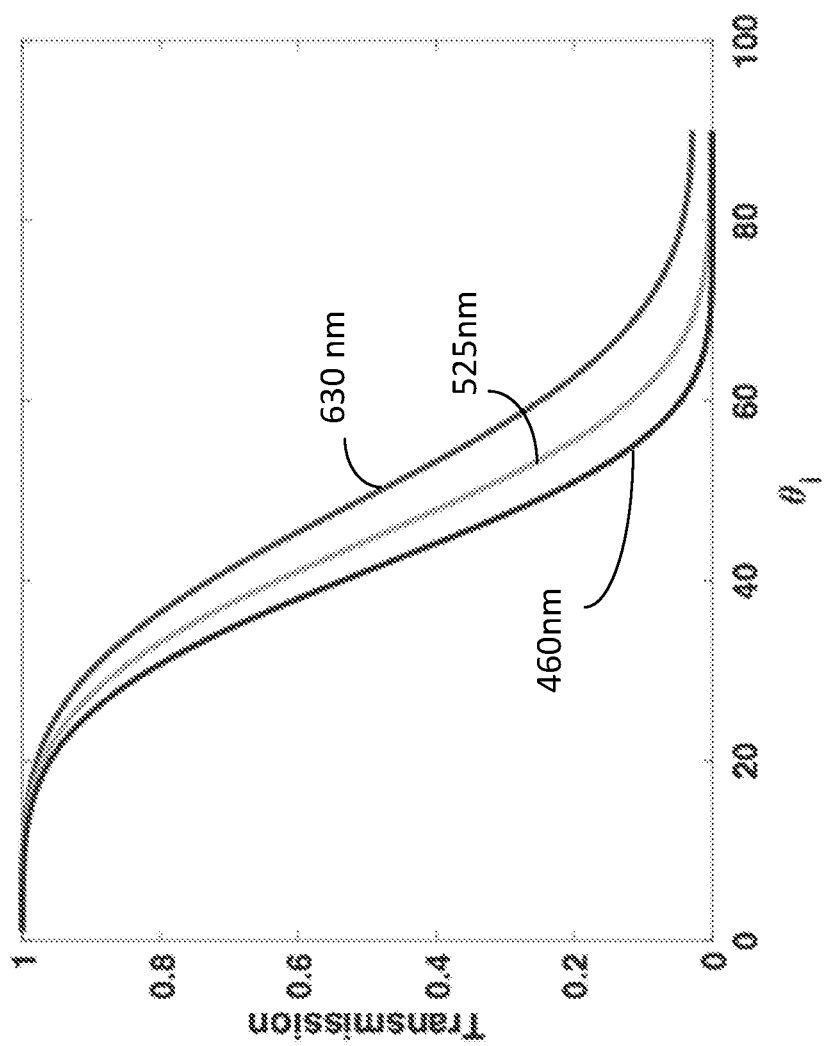
FIG. 12 is a plot showing transmission as a function of incident light angle through another example of an angularly selective film.

The use of multiple stages in series can enable stronger attenuation of light from large angles of incidence. For example, referring to FIG. 11, transmission as a function of incident angle for a two-stage C-plate arrangement, such as stack 1010, is shown. In this example, no=1.5236, ne=1.52, the thickness of the C-plate in the first stage (i.e., 1040b) is d1=111 µm, and the thickness of the C-plate in the second stage (i.e., 1040a) is d2=111 µm. Compared to the single stage film depicted in FIG. 10, transmission at high angles of incidence out to 90° remains low at 460 nm and 52.5 nm, rather than increase from a minimum value between 60° and 80°.

A variety of suitable different materials can be used for each of the layers in an angularly selective film. Linear polarizers, for example, can be formed from stretched polymer material (e.g., PVA) that has been stained with a chromophore (e.g., iodine). Commercially available linear polarizers, such as those available from Sanritz Co. (Japan) or ditto Denko (Japan), can be used. QWs can be made from stretched polymer films or liquid crystal polymer films, for example. C-plates can be formed from cast polymer films, such as case cellulose triacetate, for example. Liquid crystal polymer C-plates are also possible.

Generally, while each layer is represented as a homogenous layer, composite layers are possible. For example, C-plates can be formed from multiple stacked layers each having different optical properties from its adjacent layers. Similarly, multi-layer QWs can be used.

In general, the film stacks can include additional layers beyond those described above. For instance, stacks an include additional layers to provide mechanical functions, rather than optical functions. Adhesive layers and/or layers for mechanical strength and/or environmental protection can be included. Such layers can be optically isotroptic, so as to not significantly impact polarization of transmitted light. In some embodiments, the stack includes one or more layers on the world side of the outermost linear polarizer. For instance, antireflection films and/or hardcoat layers can be included.

Figure 13:
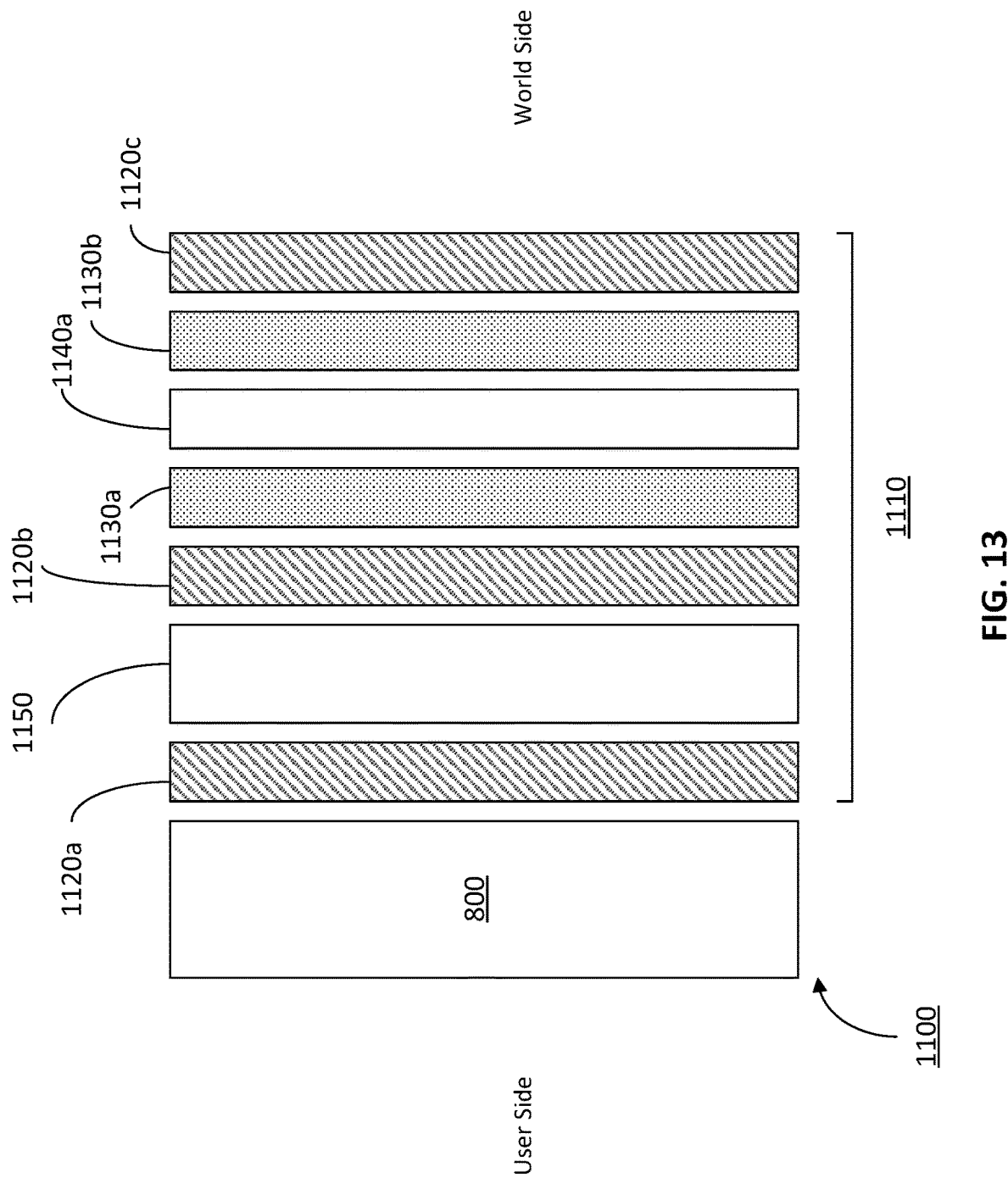
FIG. 13 is a schematic diagram of an eyepiece with a display combiner and an example of an angularly selective film that include a segmented dimmer.

While the foregoing examples of angularly selective films include optically passive elements, more generally, implementations can feature optically active elements too. Such elements can change their optical properties, and thus change the transmissive properties of the angularly selective film, in response to an electrical signal or some other physical stimulus. For example, FIG. 13 shows an eyepiece 1100 that includes a stack 1110 on display combiner 800 that includes a liquid crystal (LC) segmented dimmer 1150 in addition to several passive optical films. Film stack 1110 includes polarizers 1120a, 1120b, and 1120c (e.g., linear polarizers). A polarization adjusting stack composed of a C-plate 1140 between two A-plates 1130a and 1130b is arranged between polarizers 1120b and 1120c on the world side of dimmer 1150, which is arranged between polarizers 1120a and 1120b. Effectively, stack 1110 corresponds to a single stage attenuator (as shown in FIG. 9) stacked with LC dimmer 1150.

Segmented LC dimmer 1150 is a pixelated device that allows variable control of light transmission across the area of eyepiece 1100. In some embodiments, LC dimmer 1150 includes a layer of a liquid crystal material (e.g., a nematic LC material) between two transparent electrodes (e.g., formed from indium tin oxide). The electrodes can be patterned to form pixels that can each be individually addressed by drive signals to control the orientation of LC molecules in the LC layer. Transmission through each pixel will generally vary as a function of the voltage applied to the pixel electrodes. LC dimmer 1150 can operate as a variable neutral density filter, for example where transmission through the dimmer is constant across its area, but varies over time. For example, transmission through the dimmer can be reduced in bright ambient environments, e.g., when using the system in direct sunlight. In darker environments, transmission can be increased.

LC dimmer 1150 can also vary transmission through the stack across the area of the eyepiece. For example, in areas with substantial overhead illumination, LC dimmer 1150 can reduce transmission in the upper half of the eyepiece will leaving transmission in the lower half of the eyepiece relatively high.

Using the spatial control of the LC dimmer over the area of the eyepiece may also be used as a method of artifact suppression, though this function should be balanced with preserving the user's view of the world. The dimmer may be darkened in front of the area of eyepiece that generates the stray light path, therefore reducing the magnitude of the associated artifact.

Dimmers can be included in multi-stage stacks too. For example, referring to FIG. 14, an eyepiece 1200 includes a stack 1210 mounted on display combiner 800 that includes a segmented dimmer 1250 in addition to a two stage angularly selective film. Specifically, stack 1210 includes polarizers 1220a, 1220b, 1220c, and 1220d, Dimmer 1250 is located between polarizers 1220a and 1220b, closest to display combiner 800. One stage of the angularly selective film includes QWs 1230a and 1230b arranged on either side of a C-plate 1240a. The other stage includes QW's 1230c and 1230d arranged on either side of a C-plate 1240b.

Figure 15:
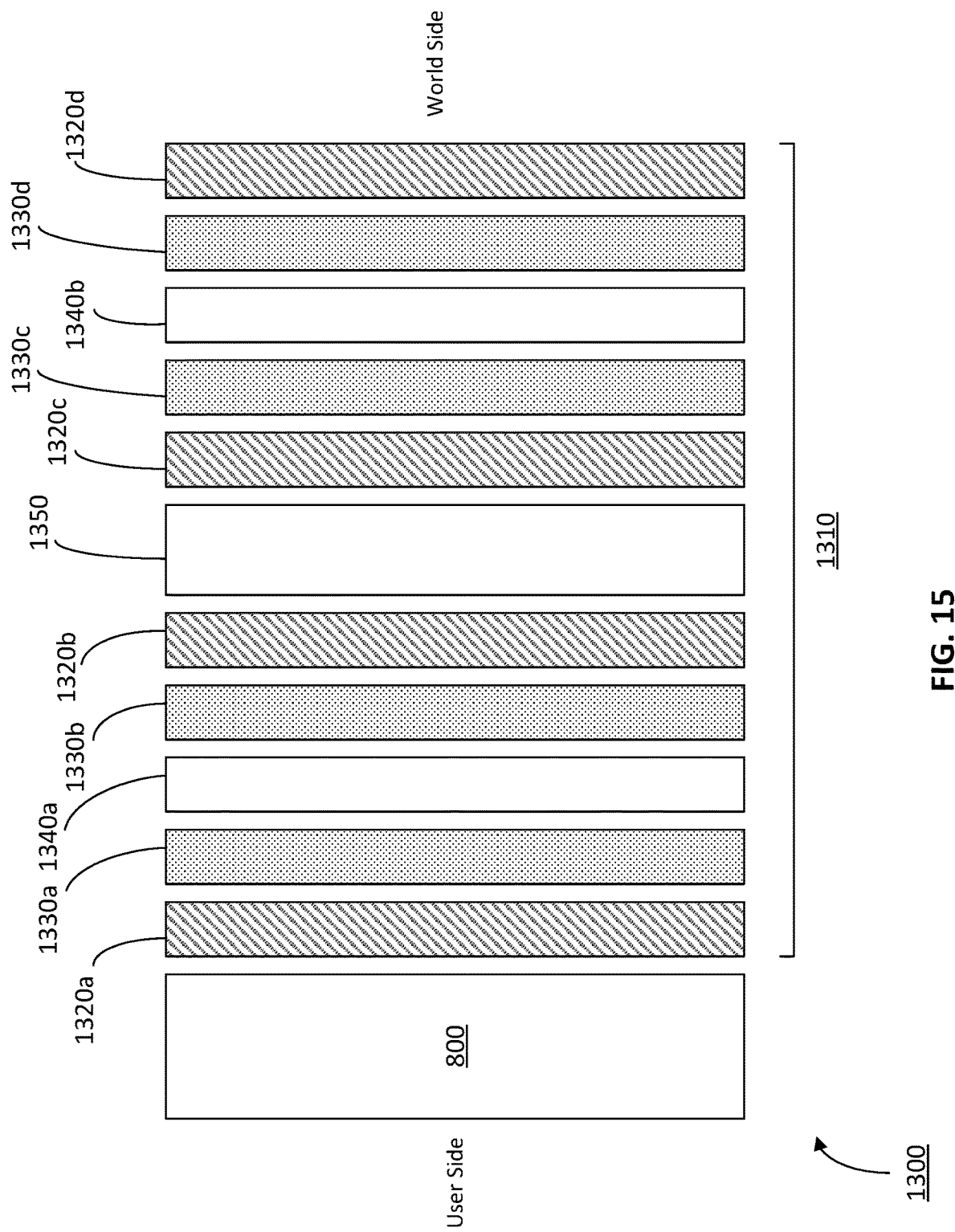
FIG. 15 is a schematic diagram of an eyepiece with a display combiner and yet a further example of an angularly selective film that include a segmented dimmer.

In some embodiments, a dimmer can be included between angularly selective film stages. For example, FIG. 15 shows an eyepiece 1300 that includes a stack 1310 on a world side of display combiner 800, the stack including a segmented dimmer 1350 between two stages of an angularly selective film. Stack 1310 includes polarizers 1320a, 1320b, 1320c, and 1320d. Dimmer 1350 is located between polarizers 1320a and 1320b, closest to display combiner 800. One stage of the angularly selective film includes QWs 1330a and 1330b arranged on either side of a C-plate 1340a. The other stage includes QWs 1330c and 1330d arranged on either side of a C-plate 1340b.

Figure 14:
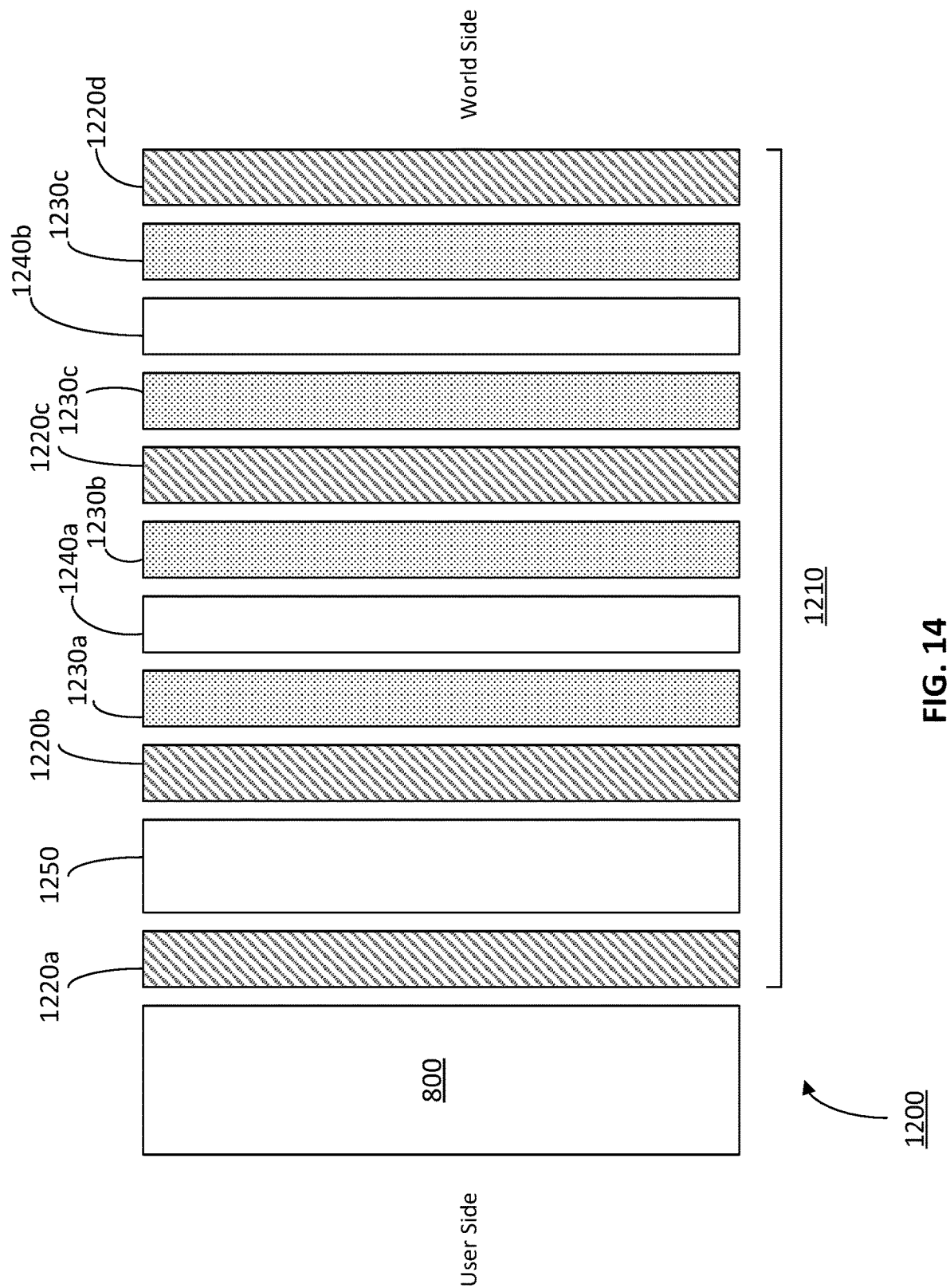
FIG. 14 is a schematic diagram of an eyepiece with a display combiner and another example of an angularly selective film that include a segmented dimmer.

Placing a single stage angularly selective film on either side of the dimmer, as in FIG. 15, may be advantageous over having a two stage angularly selective film on one side of the dimmer, as in FIG. 14, e.g., from a mechanical perspective to save space in the stack of optical components used in the augmented reality display.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 16:
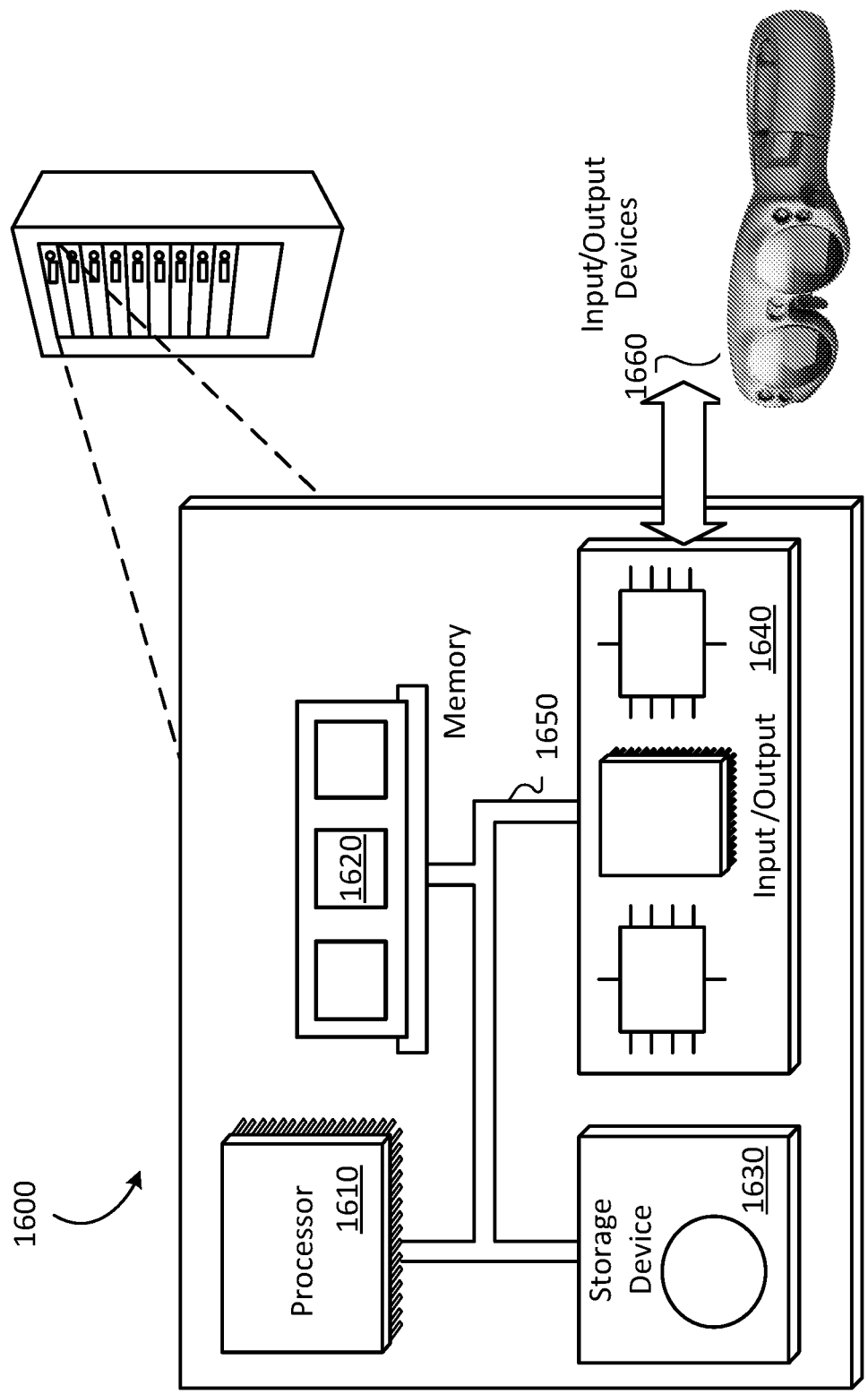
FIG. 16 is a diagram of an example computer system useful with a wearable display system.

FIG. 16 shows an example computer system 1600 that includes a processor 1610, a memory 1620, a storage device 1630 and an input/output device 1640. Each of the components 1610, 1620, 1630 and 1640 can be interconnected, for example, by a system bus 1650. The processor 1610 is capable of processing instructions for execution within the system 1600. In some implementations, the processor 1610 is a single-threaded processor, a multi-threaded processor, or another type of processor. The processor 1610 is capable of processing instructions stored in the memory 1620 or on the storage device 1630. The memory 1620 and the storage device 1630 can store information within the system 1600.

The input/output device 1640 provides input/output operations for the system 1600. In some implementations, the input/output device 1640 can include one or more of a network interface device, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., wearable display system 1660. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of implementations have been described. Nevertheless, it will be understood that various modifications may be made without departing from the spirit and scope of the invention. Accordingly, other implementations are within the scope of the following claims.

What is claimed is:

1. A wearable display system, comprising:
   an eyepiece stack which transmits ambient light from a user's environment from a world side to a user side opposite the world side, wherein during use a user positioned on the user side views displayed images delivered by the wearable display system via the eyepiece stack which augment the user's field of view of the user's environment; and
   an angularly selective film arranged on the world side of the eyepiece stack, the angularly selective film comprising a passive polarization adjusting film arranged between a pair of linear polarizers,
   wherein the linear polarizers and polarization adjusting film significantly reduces transmission of visible light incident on the angularly selective film at large angles of incidence without significantly reducing transmission of light incident on the angularly selective film at small angles of incidence, wherein for a D65 source, the angularly selective film shifts a (0.33, 0.33) CIE 1931 white point less than (+/−0.02, +/−0.02) for unpolarized light with an angle of incidence between −32° and +32°.

2. A wearable display system, comprising:
an eyepiece stack having a world side and a user side opposite the world side, wherein during use a user positioned on the user side views displayed images delivered by the wearable display system via the eyepiece stack which augment the user's field of view of the user's environment; and
an angularly selective film arranged on the world side of the eyepiece stack, the angularly selective film comprising a passive polarization adjusting film arranged between a pair of linear polarizers,
wherein the linear polarizers and polarization adjusting film significantly reduces transmission of visible light incident on the angularly selective film at large angles of incidence without significantly reducing transmission of light incident on the angularly selective film at small angles of incidence, wherein for a D65 source, the angularly selective film shifts a (0.33, 0.33) CIE 1931 white point less than (+/−0.02, +/−0.02) for unpolarized light with an angle of incidence between −32° and +32°.

3. The wearable display system of claim 2, wherein pass axes of the two linear polarizers are crossed.

4. The wearable display system of claim 2, wherein the polarization adjusting film rotates a polarization state of light transmitted by a first linear polarizer of the pair of linear polarizers on the world side of the polarization adjusting film.

5. The wearable display system of claim 4, wherein an amount of rotation of the polarization state varies depending on an angle of incidence of light transmitted by the first linear polarizer of the pair of linear polarizers.

6. The wearable display system of claim 5, wherein the light transmitted having large angles of incidence is rotated less than the light transmitted having small angles of incidence.

7. The wearable display system of claim 2, wherein unpolarized light of wavelength in a range from 420 nm to 680 nm incident of the angularly selective film with an angle of incidence between 35° and 65° has a transmission efficiency less than 0.5%.

8. The wearable display system of claim 2, wherein the angularly selective film has an area greater than 50 mm×50 mm.

9. The wearable display system of claim 2, wherein the polarization adjusting film comprises at least one layer of a birefringent material.

10. The wearable display system of claim 9, wherein the at least one layer of birefringent material comprises a C-plate.

11. The wearable display system of claim 10, wherein the at least one layer of birefringent material comprises a pair of quarter wave plates, the quarter wave plates being disposed on opposite sides of the C-plate.

12. The wearable display system of claim 11, wherein each quarter wave plate is arranged relative to a corresponding one of the linear polarizers to form a circular polarizer.

13. The wearable display system of claim 10, wherein the at least one layer of birefringent material comprises at least one quarter wave plate.

14. The wearable display system of claim 2, wherein the polarization adjusting film is a first polarization adjusting film and the angularly selective film further comprises a second polarization adjusting film and a third linear polarizer, the second polarization adjusting film being arranged between the pair of linear polarizers and the third linear polarizer.

15. The wearable display system of claim 14, wherein the first and second polarization adjusting films are each composed of one or more layers of birefringent materials.

16. The wearable display system of claim 15, wherein the one or more layers of birefringent materials of the first and second polarization adjusting films each comprises a C-plate.

17. The wearable display system of claim 16, wherein the one or more layers of birefringent materials of the first and second polarization adjusting films each comprise a pair of quarter wave plates arranged on opposite sides of the corresponding C-plate.

18. The wearable display system of claim 2, wherein the angularly selective film comprises two or more stages, each stage comprising a polarization adjusting film arranged between a pair of linear polarizers.

19. The wearable display system of claim 18, wherein adjacent stages share a linear polarizer.

* * * * *